US012621916B2

(12) United States Patent
Krijn et al.

(10) Patent No.: US 12,621,916 B2
(45) Date of Patent: May 5, 2026

(54) CONTROLLING AN ENVIRONMENTAL CONDITION BASED ON ANTICIPATED INFLUENCE OF CONTROL OF A FURTHER ENVIRONMENTAL CONDITION

(71) Applicant: SIGNIFY HOLDING B.V., Eindhoven (NL)

(72) Inventors: Marcellinus Petrus Carolus Michael Krijn, Eindhoven (NL); Lambertus Antonius Johannes Van De Wijdeven, Sint Oedenrode (NL); Rob Franciscus Maria Van Elmpt, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 710 days.

(21) Appl. No.: 17/640,113

(22) PCT Filed: Sep. 7, 2020

(86) PCT No.: PCT/EP2020/074942
§ 371 (c)(1),
(2) Date: Mar. 3, 2022

(87) PCT Pub. No.: WO2021/048049
PCT Pub. Date: Mar. 18, 2021

(65) Prior Publication Data

US 2024/0040972 A1 Feb. 8, 2024

(30) Foreign Application Priority Data

Sep. 10, 2019 (EP) .................................... 19196320

(51) Int. Cl.
*H05B 47/175* (2020.01)
*H05B 47/105* (2020.01)

(52) U.S. Cl.
CPC ......... *H05B 47/175* (2020.01); *H05B 47/105* (2020.01)

(58) Field of Classification Search
None
See application file for complete search history.

(56) References Cited

U.S. PATENT DOCUMENTS 9,872,357 B1 1/2018 Aikala
2010/0115830 A1* 5/2010 Dube ................ G01N 21/6486 356/402

(Continued)

FOREIGN PATENT DOCUMENTS

CN 107728473 A 2/2018
CN 106371318 B 12/2018
WO 2015140820 A1 9/2015

*Primary Examiner* — Matthew G Marini

(57) ABSTRACT

A system (31) for determining at least one control parameter for at least one device (41) controlling an environmental condition in a plain growing environment is configured to obtain one or more target values for the environmental condition and receive information relating to control of a further environmental condition in the plant growing environment, e.g. from another system (1). The system is further configured to determine data which represent an anticipated influence of the control of the further environmental condition on the environmental condition from the information and determine the at least one control parameter for the at least one device controlling the environmental condition based on the one or more target values and the data. The system is also configured to output or store the at least one control parameter.

19 Claims, 5 Drawing Sheets

(56) References Cited

U.S. PATENT DOCUMENTS

| | | | | |
|---|---|---|---|---|
| 2015/0089866 | A1* | 4/2015 | Abbott | H05B 47/175 315/307 |
| 2015/0342125 | A1 | 12/2015 | Krijn et al. | |
| 2016/0366833 | A1* | 12/2016 | Pohjanvouri | G05B 15/02 |
| 2017/0034895 | A1 | 2/2017 | Vogel | |
| 2017/0135288 | A1 | 5/2017 | Krijn et al. | |

* cited by examiner

CONTROLLING AN ENVIRONMENTAL CONDITION BASED ON ANTICIPATED INFLUENCE OF CONTROL OF A FURTHER ENVIRONMENTAL CONDITION

CROSS-REFERENCE TO PRIOR APPLICATIONS

This application is the U.S. National Phase application under 35 U.S.C. § 371 of International Application No. PCT/EP2020/074942, filed on Sep. 7, 2020, which claims the benefit of European Patent Application No. 19196320.6, filed on Sep. 10, 2019. These applications are hereby incorporated by reference herein.

FIELD OF THE INVENTION

The invention relates to a system for determining at least one control parameter for at least one device controlling an environmental condition in a plant growing environment and a system for controlling an environmental condition in a plant growing environment.

The invention further relates to a method of determining at least one control parameter for at least one device controlling an environmental condition in a plant growing environment and a method of controlling an environmental condition in a plant growing environment.

The invention also relates to a computer program product enabling a computer system to perform such methods.

BACKGROUND OF THE INVENTION

The world population is expected to grow from 6.5 billion now to 9 billion in 2050. Society is rapidly becoming predominantly urban. This will place major constraints on the availability of food and clean water. The space available for food production will become scarcer. Innovation in production methods is needed to deliver higher yields from smaller footprints, while becoming more sustainable (minimum use of energy and water).

Producing food in closed environments such as vertical farms is a method to meet these demands. In vertical farms (a.k.a. plant factories and city farms), food is grown in multiple layers, making much better use of the available space as compared to outdoor growth or growth in greenhouses. This implies that daylight will not be able to reach all plants and nearly all the light must come from artificial lighting. Horticulture lighting control systems are therefore becoming more and more advanced, just like horticulture climate control systems.

The optimal growth conditions (climate conditions and light conditions) are described in a so-called grow recipe or grow protocol. Traditionally, during the execution of such a grow recipe, the control of the climate is done separately from the control of the light. The benefit is that the producers of climate control systems and lighting control systems can optimize their systems based on their specific expertise and independent of each other.

An example of a method of controlling an artificial light plant growing system in which the control of the climate is not done totally separately from the control of the light is disclosed in US 2017/135288 A1. The method disclosed in US 2017/135288 A1 includes receiving information indicative of a production demand for a plant type to be grown in the artificial light plant growing system and information indicative of an energy supply for a light source of the artificial light plant growing system, and controlling operation of the light source of a plant growing environment of the artificial light plant growing system in dependence on the received information so that the production rate of a plant of said plant type grown in the system versus the production demand and energy supply is optimized. In an embodiment, the level of CO2 in the plant growing environment is controlled based on the determined operation of the light source.

A drawback of the method disclosed in US 2017/135288 A1 is that the synergy between multiple environmental parameters is only taken into account in a limited manner.

SUMMARY THE INVENTION

It is a first object of the invention to provide a system, which is able to facilitate simultaneous control of multiple environmental parameters such that the synergy between the environmental parameters is taken into account thoroughly.

It is a second object of the invention to provide a method, which is able to facilitate simultaneous control of multiple environmental parameters such that the synergy between the environmental parameters is taken into account thoroughly.

In a first aspect of the invention, a system for determining at least one control parameter for at least one device controlling an environmental condition in a plant growing environment, comprises at least one communication interface and at least one processor configured to obtain one or more target values for said environmental condition, use said at least one communication interface to receive information relating to control of a further environmental condition in said plant growing environment, determine data which represent an anticipated influence of said control of said further environmental condition on said environmental condition from said information, determine said at least one control parameter for said at least one device controlling said environmental condition based on said one or more target values and said data, and output or store said at least one control parameter. Said at least one control parameter may be stored in a memory of said system or of another system, for example.

By not just controlling the environmental condition in the plant growing environment based on a current (e.g. measured) value of a further environmental condition or a current control parameter for controlling this further environmental condition, but by (also) controlling the environmental conditional based on an anticipated influence of control of the further environmental condition on the environmental condition, it may be ensured that controlling the two environmental conditions simultaneously has the desired result, thereby saving/minimizing cost while optimizing plant growth. For example, if continued use of certain lamps (slowly) increases the temperature of the environment, the heat setting of a heater may be lowered prior to changing the light settings to prevent that an air-conditioning unit needs to be activated later to remove some of the heat.

The system may be used to grow vegetables and fruits in vertical farms or greenhouses, for example. Said at least one device may comprise a plurality of devices and/or said at least one control parameter may comprise a plurality of control parameters for controlling said at least one device during a control period. Said control period may be a future control period, for example. Said at least one processor may be configured to use said at least one communication interface to control said at least one device according to said at least one control parameter.

Said information may be received from a further system. Said system may be a climate control system or a plant growth control system and said further system may be a lighting control system, for example.

Said at least one processor may be configured to obtain a grow protocol for growing a plant, said grow protocol comprising said one or more target values, each of a plurality of growth stages being associated with at least one of said one or more target values. A grower may be able to select a grow protocol from a database and let one or more horticultural systems use the selected grow protocol to determine control parameters for devices that are able to affect environmental conditions based on the specified target values. The grow protocol may specify target values for light spectrum, nutrition conditions and climate conditions (e.g. $CO_2$ and temperature) per growth stage, for example. A grow protocol is also referred to as a grow recipe in this description.

Said environmental condition may comprise temperature and said further environmental condition may comprise lighting, for example. In this case, said information may comprise, for example, a profile representing expected heat dissipation (e.g. thermal load in Watt) and/or expected temperature increase (e.g. in degrees Celsius), typically linked to an expected illumination output or expected lighting control parameters. For example, said at least one processor may be configured to determine an anticipated temperature variation from said information, subtract said anticipated temperature variation from said one or more target values for said temperature and determine said at least one control parameter based on a result of said subtraction.

Alternatively, said environmental condition may comprise lighting and said further environmental condition may comprise temperature, for example. As a first example, said at least one device may comprise at least one lighting device which comprises at least one component for cooling and/or heating and said information may comprise a profile representing anticipated environmental temperature variations. Said at least one processor may be configured to determine said at least one control parameter for said at least one lighting device so as to adjust said cooling and/or heating in dependence on said anticipated environmental temperature variations exceeding a threshold amount.

When the anticipated environmental temperature variations exceed the threshold amount, this may cause condensation (which may be undesired). This may be prevented by having the at least one component adjust the cooling and/or heating. Said anticipated environmental temperatures may be determined by a climate control system based on how fast or slow it increases or decreases temperature to achieve desired temperatures.

As a second example, said at least one device may comprise at least one lighting device, said information may comprise a profile representing anticipated environmental temperature variations, and said at least one processor may be configured to control said at least one lighting device to render light with a higher or lower output level than specified in said target values in dependence on said anticipated environmental temperature variations exceeding a threshold amount. These variations may be increases exceeding the threshold and/or decreases exceeding the threshold. This may be beneficial for lighting devices that do not comprise an active component for cooling and/or heating. By using a higher output level than specified, additional heat may be generated to prevent condensation. For instance, if a lamp should normally be turned off but a burst of heat is expected from a heating system at a certain time (according to the grow protocol), it may be kept on at a low level to have its circuitry generate some heat before the burst of heat arrives. Preferably, the output level is not much higher than specified in the target values in order to prevent wasting light/energy.

In case said at least one device comprises at least one lighting device, it may be beneficial for said at least one processor to be configured to control said at least one lighting device to render light with a lower output level at a certain moment than specified in said desired target values in dependence on an expected or measured environmental temperature being below a minimum amount at said certain moment. If the environmental temperature is below the minimum amount, the plants may no longer be able to grow and rendering light would be a waste of energy/money in that case.

Said at least one processor may be further configured to use said at least one communication interface to obtain electricity cost and/or demand information and determine said at least one control parameter further based on said electricity cost and/or demand information. By taking electricity cost and/or market demand into account on top of the environmental conditions, further costs may be saved.

In a second aspect of the invention, a system for controlling an environmental condition in a plant growing environment, comprises at least one communication interface; and at least one processor configured to use said at least one communication interface to receive one or more target values for said environmental condition, determine information from said one or more target values, said information comprising data which represent an anticipated influence of said control of said environmental condition on a further environmental condition, use said at least one communication interface to transmit said information, and control said environmental condition based on said one or more target values.

The system that controls an environmental condition is typically the best source for information on how the control of the environmental condition is anticipated to influence a further environmental condition, e.g. how much heat the system dissipates to render a certain lighting spectrum.

In a third aspect of the invention, a method of determining at least one control parameter for at least one device controlling an environmental condition in a plant growing environment, comprises obtaining one or more target values for said environmental condition, receiving information relating to control of a further environmental condition in said plant growing environment, determining data which represent an anticipated influence of said control of said further environmental condition on said environmental condition from said information, determining said at least one control parameter for said at least one device controlling said environmental condition based on said one or more target values and said data, and outputting or storing said at least one control parameter. Said method may be performed by software running on a programmable device. This software may be provided as a computer program product.

In a fourth aspect of the invention, a method of controlling an environmental condition in a plant growing environment, comprises receiving one or more target values for said environmental condition, determining information from said one or more target values, said information comprising data which represent an anticipated influence of said control of said environmental condition on a further environmental condition, transmitting said information, and controlling said environmental condition based on said one or more target values. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the software code portion, when executed or processed by a computer, being configured to perform executable operations for determining at least one control parameter for at least one device controlling an environmental condition in a plant growing environment.

The executable operations comprise obtaining one or more target values for said environmental condition, receiving information relating to control of a further environmental condition in said plant growing environment, determining data which represent an anticipated influence of said control of said further environmental condition on said environmental condition from said information, determining said at least one control parameter for said at least one device controlling said environmental condition based on said one or more target values and said data, and outputting or storing said at least one control parameter.

A non-transitory computer-readable storage medium stores at least a second software code portion, the software code portion, when executed or processed by a computer, being configured to perform executable operations for controlling an environmental condition in a plant growing environment which comprise receiving one or more target values for said environmental condition, determining information from said one or more target values, said information comprising data which represent an anticipated influence of said control of said environmental condition on a further environmental condition, transmitting said information, and controlling said environmental condition based on said one or more target values.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor) of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming, languages, including an object oriented programming language such as Java™, Smalltalk, C++ or the like and conventional procedural programming languages, such as the "C" programming language or similar programming languages. The program code may execute entirely on the user's computer, partly on the uses computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, the term “anticipated influence” refers to the effect that the controlling of a first environmental condition (e.g. temperature, light, $CO_2$, humidy, irrigation, etc.) with a first control system has on a second environmental condition (e.g. temperature, light, $CO_2$, humidy, irrigation, etc.) controlled with a second control system. Typically, the first control system is different from the second control system and the first environmental condition is a different physical property/characteristic of the environment than the second environmental condition. An anticipated influence is generally a side-effect resulting from controlling a first environmental condition, which side-effect is anticipated to influence a second environmental condition, e.g. a side-effect of increasing the illumination ouput of light sources is an increased heat dissipation by the lighting system from which an anticipated increase in temperature of the environment is to be expected. The term “anticipated” refers to expected to happen, foreseeable. An anticipated influence can therefore also be explained as an expected or foreseeable (future) effect.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
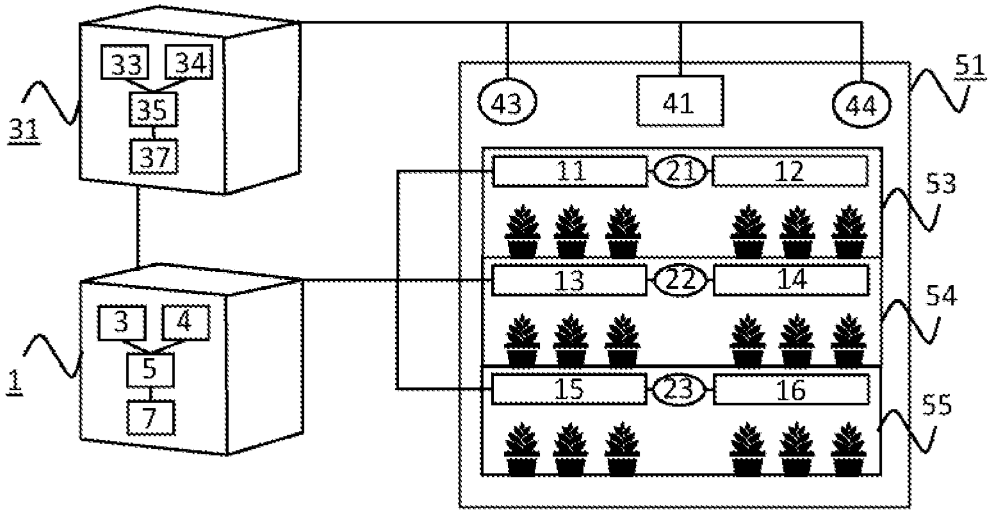
FIG. 1 is a block diagram of a first embodiment of the systems.

FIG. 1 shows a first embodiment of the system for determining at least one control parameter for at least one device controlling an environmental condition in a plant growing environment. FIG. 1 further shows a first embodiment of the system for controlling an environmental condition in a plant growing environment.

In vertical farms (or green houses), plants are grown in a very well-controlled environment. The climate (temperature, humidity, CO2 level) is optimal for growth and controlled by a climate control system. This also holds for the light conditions offered to the plants (light intensity, spectrum, and their dependence on the time of day and growth stage of the plant). The light conditions are controlled by a lighting control system.

The optimal growth conditions (typically climate conditions and light conditions) are described by a so-called grow protocol (typically comprising a climate recipe and a light recipe). Traditionally, during the execution of such a grow protocol, the control of the climate is done separately from the contra of the light. The drawback is that there is no benefit from the synergy that is possible when the two systems can communicate information about their system settings.

In the example of FIG. 1, the plant growing environment comprises a vertical farm 51 of one rack with three layers 53-55. Each of the layers 53-55 comprises two segments. Layer 53 comprises two LED modules 11-12 (one per segment) and a light sensor 21. Layer 54 comprises two LED modules 13-14 (one per segment) and a light sensor 22. Layer 55 comprises two LED modules 15-16 (one per segment) and a light sensor 23.

The vertical farm 51 further comprises two climate sensors 43-44 and a Healing, Ventilation and Air Conditioning (HVAC) system 41. FIG. 1, HVAC system 41 is depicted centrally in the vertical farm 51. However, parts of the HVAC system 41 may be located on each of layers 53-55, e.g. in order to provide ventilation to the plants. The climate sensors 43-44 may comprise a temperature sensor and a CO2 sensor, for example.

The LED modules 11-16 are controlled by a light control computer 1. The light control computer 1 comprises a receiver 3, a transmitter 4, a processor 5, and memory 7. The processor 5 is configured to use the receiver 3 to receive sensor data from the light sensors 21-23, e.g. to adjust for light coming from other light sources like the sun.

The HVAC system 41 is controlled by a climate control computer 31. The climate control computer 31 comprises a receiver 33, a transmitter 34, a processor 35, and memory 37. The processor 35 is configured to use the receiver 33 to receive sensor data from climate sensors 43-44, e.g. to increase heating or cooling if the measured temperature has become, respectively, lower or higher than desired. The climate control computer 31 may also control provision of water and nutrients to the plants, e.g. via pipes (not shown).

In a first variant of this first embodiment, the processor 5 of the light control computer 1 is configured to use the receiver 3 to receive one or more target values for the lighting condition, e.g. from a server (not shown) or from the climate control computer 31, and determine information from the one or more target values. This information comprises data which represent an anticipated influence of the control of the lighting condition on the temperature.

The information may comprise a profile representing expected heat dissipation (e.g. in Watt) and/or expected temperature increase (e.g. in degrees Celsius), for example. The processor 5 is further configured to use the transmitter 4 to transmit the information to the climate control computer 31 and use the transmitter 4 to control the lighting condition (via the LED modules 11-16) based on the one or more target values.

In this first variant, the processor 35 of the climate control computer 31 is configured to obtain one or more target values for the temperature, e.g. stored in the memory 37 or on a server (not shown), use the receiver 33 to receive the information (relating to control of the lighting condition in the plant growing environment) from the light control computer 1, determine data which represent an anticipated influence of the control of the lighting condition on the temperature from the information, determine at least one control parameter for HVAC system 41 based on the one or more target values and the data, and control the HVAC system 41 according to the at least one control parameter.

The processor 35 and/or the processor 5 may be configured to obtain the target values by obtaining a grow protocol for growing a plant. The grow protocol comprises the one or more target values and each of a plurality of growth stages is associated with at least one of the one or more target values.

Thus, a vertical farm (or greenhouse) has a climate control system for controlling climate conditions and a lighting control system for controlling lighting conditions such as to grow plants in an optimal manner by providing growth conditions (including climate conditions and lighting conditions) as defined by a grow protocol (which comprises a climate recipe and a light recipe).

Next to producing light, the lighting control system also produces heat, heating up the climate cell, e.g. in a vertical farm, in which the plants are located. The climate control system is needed to remove this heat. The climate cell and its components (e.g. racks, growth layers, irrigation water, air, plants, etc.) have a certain heat capacity and heat transfer coefficient. This makes that it takes a certain time before the climate in the climate cell is fully adapted to a change in a climate setpoint (i.e. target value).

In case the climate control system has no information as to when the lighting is going to be switched on, it cannot anticipate future heat removal needs and will therefore always lag in realizing the climate setpoints. Similarly, the climate control system cannot anticipate future energy consumption. The lighting control system therefore communicates present and future heat load and energy consumption to the climate control system. The climate control system uses this information to anticipate changes in heat load and energy consumption to optimally realize the settings as defined by the climate recipe.

In the embodiment of FIG. 1, the lighting control system consists of the local light control computer 1 and the climate control system consists of the local climate control computer 31. Typically, the light control and climate control functions are controlled by separate software applications that communicate via an application program interface (API). The climate control system and the lighting control system may have a master-slave relation and if so, may negotiate who is master and who is slave.

Furthermore, the light control computer 1 may use the electricity price or electricity demand-response information to adjust the lighting conditions in the light recipe to obtain the best trade-off between cost (of energy) and crop production (e.g. by changing the daily light period and light level such that the daily light integral is not affected) and may reflect this adjustment in the information it transmits to the climate control computer 31.

In this first variant, the processor 35 is configured to determine an anticipated temperature variation from the information, subtract the anticipated temperature variation from the one or more target values for the temperature and determine the at least one control parameter based on a result of the subtraction. The determined at least one control parameter typically comprises a plurality of control parameters for controlling the HVAC system 41 during a future control period, but alternatively, one control parameter may be determined at a time, to be used immediately.

Consider, for example, a situation in which a vertical farm or greenhouse needs to be heated to reach a certain desired setpoint temperature (for example during wintertime) for optimum plant growth. The typical time $\Delta\tau$ it takes to realize a temperature setpoint change (a change by an amount $\Delta T$) in the air temperature in the vertical farm or greenhouse, is given by the following equation:

$$\Delta\tau = \frac{m\ c\ \Delta T}{P - \frac{dQ_{loss}}{dt} + \frac{dQ_{lamps}}{dt}} \quad \text{(Equation 1)}$$

Here, P (or $Q_{HVAC}$/dt) denotes the heat power transferred to the air by the HVAC system 41 (in J/s). $Q_{loss}$ (in Joules) is the heat loss (or gain) through the ceiling (e.g. via opening of the windows), the side walls and the floor of the vertical farm or greenhouse, and via radiation. $Q_{lamps}$ (in joules) is the heat transferred to the air via the LED modules 11-16 (other heat sources are neglected). m is the mass of the air in the vertical farm or greenhouse to be heated (in kg, and proportional to the volume of the vertical farm or greenhouse), and c is the heat capacity of air (approximately 1 kJ/kg/K at room temperature).

If the temperature needs to be kept stable, the heat power P that needs to be transferred to the air to keep the air temperature stable (i.e. to keep dTair/dt=0) depends on the heat losses $Q_{loss}$, as well as the heat $Q_{lamps}$ transferred to the air by the lighting control system (note that a negative value of P implies cooling instead of heating). If the temperature needs to be increased or decreased, the time it takes to reach a setpoint depends on the heat power P provided by the HVAC system, the heat loss $dQ_{loss}$/dt (depending for example on the difference between the air temperature inside and air temperature outside the vertical farm or greenhouse), and the heat power provided by the lamps ($dQ_{lamps}$/dt). This implies that the time constant will depend on the dimming level of the lighting system.

The heat $Q_{lamps}$ transferred to the air by the lighting system may follow the following relation:

$$Q_{lamps}(t) = \alpha L(t) \quad \text{(Equation 2)}$$

L(t) is the dimming level of the lamps at time t (the dimming level being a value between 0(=lamps off) and 1(=lamps fully on)). In equation 2, a is a constant. It is clear from Equations 1 and 2 how the dimming level L(t) may influence the air temperature in a vertical farm or greenhouse, including the corresponding time constants.

L(t) may be determined based on the light recipe. The climate control computer 31 may obtain the light recipe from the light control computer 1 or from a server, e.g. as part of a grow protocol, and may further obtain information describing the relation between $Q_{lamps}(t)$ and L(t) from the light control computer 1 or from a server. The climate control computer 31 may then determine $Q_{lamps}(t)$ based on L(t) using the relation described in this obtained information. The climate control computer 31 may then determine the required P based on a target $\Delta\tau$ and target $\Delta T$, determined based on the climate recipe, and based on $Q_{lamps}(t)$ and $Q_{loss}(t)$. The target $\Delta T$ may be determined based on both the climate recipe and a temperature reading of one of the climate sensors 43 and 44.

Instead of the climate control computer 31 determining $Q_{lamps}(t)$ itself, the climate control computer 31 may obtain values for $Q_{lamps}(t)$ from the light control computer 1. This is especially beneficial if the relation between $Q_{lamps}(t)$ and L(t) is complex and/or requires knowledge of parameter values stored in the LED modules 11-16 and/or in the light control computer 1. Without knowing $Q_{lamps}(t)$, the climate control computer 31 would not be able to anticipate the amount of heat power required to achieve a desired temperature setpoint at a desired time. Instead of sharing values of $Q_{lamps}(t)$, the light control computer 1 might share the corresponding anticipated heat dissipation (e.g. in Watt).

In this first variant of the first embodiment, the HVAC system 41 was used to control the temperature based on an anticipated influence of the control of the lighting condition on the temperature. Similarly, the HVAC system 41 may control other climate conditions based on an anticipated influence of the control of the lighting condition on these other climate conditions. Examples of other climate conditions are humidity and CO2 concentration. For example, switching on the lighting might increase the temperature to a point where it is needed to open the windows, allowing humidity to increase or decrease and CO2 to escape, which has to be anticipated or counteracted by the HVAC system 41.

In a second variant of this first embodiment, the processor 35 of the climate control computer 31 is configured to use the receiver 33 to receive one or more target values for the climate conditions (including the temperature), e.g. from a server (not shown) or from the light control computer 1, and determine information from the one or more target values. The information comprises data which represent an anticipated influence of the control of the temperature on the lighting condition. The processor 35 is further configured to use the transmitter 34 to transmit the information to the light control computer 1 and use the transmitter 4 to control the temperature (via the HVAC system 41) based on the one or more target values.

In this second variant, the processor 5 of the light control computer 1 is configured to obtain one or more target values for the lighting condition, e.g. stored in the memory 7 or on a server (not shown), use the receiver 3 to receive information relating to control of the temperature in the plant growing environment from the climate control computer 31, determine data which represent an anticipated influence of the control of the temperature on the lighting condition from the information, determine at least one control parameter for the LED modules 11-16 based on the one or more target values and the data, and control the LED modules 11-16 according to the at least one control parameter.

In this second variant, if at least one of the LED modules 11-16 comprises at least one component for cooling and/or heating and the received information comprises a profile representing anticipated environmental temperature variations, the processor 5 may be able to determine the at least one control parameter for this LED module/these LED modules so as to adjust the cooling and/or heating in dependence on the anticipated environmental temperature variations exceeding a threshold amount (in order to prevent condensation due to rapid temperature changes).

In this second variant, the processor 5 of the light control computer 1 may be configured to control one or more of the LED modules 11-16 to render light with a lower output level at a certain moment than specified in the light recipe in dependence on the (measured or expected) environmental temperature being below a minimum amount at the certain moment.

Typically, a grower follows a certain light recipe to grow crops such as tomato in a vertical farm or greenhouse. In a simple version of such a light recipe, the lighting is switched on when the daylight level is below a certain threshold and switched on when it is above a certain threshold. In a more advanced light recipe, the light is dimmed to the most optimum level at all times, taking as input a desired daily light integral in combination with past and forecasted daylight levels, among others.

The optimum light recipe is typically dependent on climate conditions such as temperature, because the rate of photosynthesis is, in good approximation, proportional to the rate of biomass increase and the light-use-efficiency (i.e. the ratio of the rate of photosynthesis and the light level to achieve this rate of photosynthesis) is dependent on temperature. The higher the temperature, the higher the light level needs to be to achieve a high light-use-efficiency. For example, at a temperature of 22° C., a light level of 250 $\mu mol/m^2/s$ will result in the highest light-use-efficiency.

If the light control computer 1 can obtain measured or expected environmental temperatures, e.g. an anticipated temperature profile received from the climate control computer 31, the light control computer 1 can adapt the rendered light, e.g. the light recipe, to the measured or expected environmental temperatures to achieve an optimal light-use-efficiency. As a result, the light control computer will be able to decrease the light level at times during the day that the air temperature is relatively low and catch up by increasing the light level at times that the air temperature is relatively high. The lighting will therefore not be applied sub-optimally (in terms of growth efficiency, energy efficiency and, as a result, cost).

In the embodiment of FIG. 1, vertical farm 51 comprises three light sensors 21-23 transmitting data to the light control computer 1 and two climate sensors 43-44 transmitting data to the climate control computer 31. The light control computer 1 may use a detected light level as perceived by the plants (in practice this level can change appreciably during the growth of the plants) to determine how much artificial light is required to achieve the target values for the lighting. The climate control computer 31 may use a detected temperature to determine how much heating or cooling is required to achieve the target values for the temperature.

However, the light control computer 1 and the climate control computer 31 may also communicate sensor readings. For example, if the light sensors 21-23 would be part of the climate control system and transmit data to the climate control computer 31 instead of to the light control computer 1, the climate control computer 31 might then communicate the sensor readings to the light control computer 1.

In the embodiment of the computers 1 and 31 shown in FIG. 1, the computer 1 comprises one processor 5 and the computer 31 comprises one processor 35. In an alternative embodiment, the computer 1 and/or the computer 31 comprises multiple processors. The processor 5 and the processor 35 may be a general-purpose processor, e.g. from Intel or AMD, or an application-specific processor. The processor 5 and the processor 35 may run a Windows or Unix-based operating system for example. The memory 7 and the memory 37 may comprise one or more memory units. The memory 7 and the memory 37 may comprise one or more hard disks and/or solid-state memory, for example. The memory 7 and the memory 37 may be used to store an operating system, applications and application data, for example.

The receiver 3 and the transmitter 4 may use one or more wired and/or wireless communication technologies to communicate with the climate computer 31, the LED modules 11-16 and the light sensors 21-23, for example. The receiver 33 and the transmitter 34 may use one or more wired and/or wireless communication technologies to communicate with the light control computer 1, the HVAC system 41 and the climate sensors 43-44, for example.

In an alternative embodiment, multiple receivers and/or multiple transmitters are used in light control computer 1 and/or in climate control computer 31 instead of a single receiver and a single transmitter. In the embodiment shown in FIG. 1, separate receivers and separate transmitters are used. In an alternative embodiment, the receiver 3 and the transmitter 4 are combined into a transceiver and/or the receiver 33 and the transmitter 34 are combined into a transceiver. The computer 1 and the computer 31 may comprise other components typical for a computer such as a power connector and a display. The invention may be implemented using a computer program running on one or more processors.

In the embodiment of FIG. 1, the systems of the invention are computers. In an alternative embodiment, the systems of the invention may be difference devices. In the embodiment of FIG. 1, the system of the invention comprises a single device. In an alternative embodiment, the system of the invention comprises a plurality of devices. In the embodiment, of FIG. 1, the systems are used in a vertical farm. Alternatively, the systems may be used in a greenhouse, for example. In the embodiment of 1, the computers 1 and 31 use transmitters to control components in the vertical farm. In an alternative embodiment, the computers 1 and 31 use only analog wires to control the components in the vertical farm.

Figure 2:
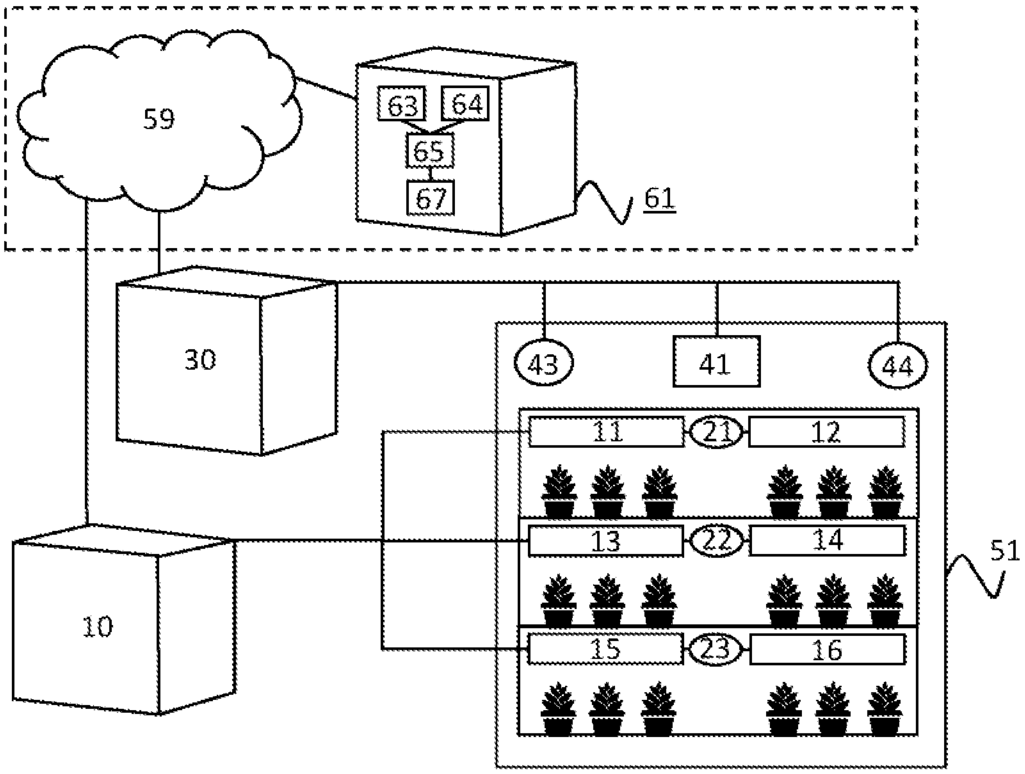
FIG. 2 is a block diagram of a second embodiment of the systems.

FIG. 2 shows a second embodiment of the system for determining at least one control parameter for at least one device controlling an environmental condition in a plant growing environment: Internet server 61. Internet server 61 comprises a receiver 63, a transmitter 64, a processor 65, and memory 67. The Internet server 61 is connected to the Internet 59. A light control computer 10 and a climate control computer 30 are connected to the Internet 59 as well, e.g. via a wireless LAN access point or a cellular communication network.

In a first variant of this second embodiment, the processor 65 of the Internet server 61 is configured to obtain one or more target values for the temperature, e.g. stored in the memory 67 in a grow protocol, obtain information relating to control of a lighting condition in the plant growing environment from the memory 67 or from the light control computer 10 (using receiver 63), determine data which represent an anticipated influence of the control of the lighting condition on the temperature from the information, determine at least one control parameter for HVAC system 41 based on the one or more target values and the data, and control the HVAC system 41 according to the at least one control parameter via the climate control computer 30.

In this first variant, the processor 65 of the Internet server 61 is further configured to obtain one or more further target values for the lighting condition, e.g. stored in the memory 67 in the grow protocol, determine at least one further control parameter for the LED modules 11-16 based on the one or more target values, and control the LED modules 11-16 according to the at least one further control parameter via the light control computer 10.

In a second variant of this second embodiment, the processor 65 is not configured to control the HVAC system 41 and the LED modules 11-16, but it transmits the at least one control parameter to the climate control computer 30 and transmits the at least one further control parameter to the light control computer 10. Whenever the grow protocol is started, the climate control system 30 can then control the HVAC system 41 according the received at least one control parameter and the light control computer 10 can then control the LED modules 11-16 according to the received at least one further control parameter.

In this second variant, the control parameters are determined from the target values, e.g. from the grow protocol, in advance/offline, e.g. just before the start of the grow protocol. This may be beneficial, for example, when environmental conditions are not affected by outside influences or are only affected to a small degree by outside influences, e.g. when plants are grown in a vertical farm without windows in a building with a stable temperature. In this case, it may also be possible to omit climate sensors 43-44 and light sensors 21-23.

It may also be possible to use this second variant in a greenhouse. For greenhouse horticulture, climate and lighting control needs depend a lot on the weather outside. It is possible to determine the control parameters based on forecasts (e.g. weather forecast in the case of greenhouse horticulture) and not on sensor measurements. However, a forecast (e.g. with parameters such as solar radiation and temperature) will be valid only for a limited time span. By determining the control parameters offline just before the start of the grow protocol, the forecast is still relatively reliable. $\Delta T$, and perhaps $Q_{loss}$, of Equation (1) may be determined based on this forecast and the target values instead of based on sensor measurements and the target values.

It may also be beneficial to combine the first and second variants. The advantage of this combination is that the system can function autonomously for the duration of the remainder of the climate or light recipe in case a connection to the cloud is lost. Thus, the Internet sever 61 would control the LED modules 11-16 and the HVAC system 41 until a connection to the cloud is lost, at which time the light control computer 10 and the climate control computer 30 will take over.

In a third variant of this second embodiment, the processor 65 of the Internet server 61 is configured to obtain one or more target values for the lighting condition, e.g. stored in the memory 67 in a grow protocol, obtain information relating to control of the temperature in the plant growing environment from the memory 67 or from the climate control computer 30 (using receiver 63), determine data which represent an anticipated influence of the control of the temperature on the lighting condition from the information, determine at least one control parameter for the LED modules 11-16 based on the one or more target values and the data, and control the LED modules 11-16 according to the at least one control parameter via the light control computer 10.

In this third variant, the processor 65 of the Internet server 61 is further configured to obtain one or more further target values for the temperature, e.g. stored in the memory 67 in a grow protocol, determine at least one further control parameter for the HVAC system 41 based on the one or more target values, and control the HVAC system 41 according to the at least one further control parameter via the climate control computer 10.

In a fourth variant of this second embodiment, the processor 65 is not configured to control the HVAC system 41 and the LED modules 11-16, but it transmits the at least one control parameter to the light control computer 10 and transmits the at least one further control parameter to the climate control computer 30. Whenever the grow protocol is started, the light control computer 10 can then control the LED modules 11-16 according to the received at least one control parameter and the climate control system 30 can then control the HVAC system 41 according the received at least one further control parameter.

In the embodiment of the server 61 shown in FIG. 2, the server 61 comprises one processor 65. In an alternative embodiment, the server 61 comprises multiple processors. The processor 65 of the server 61 may be a general-purpose processor, e.g. from Intel or AMD, or an application-specific processor. The processor 65 of the server 61 may run a Windows or Unix-based operating system for example. The memory 67 may comprise one or more memory units. The memory 67 may comprise one or more hard disks and/or solid-state memory, for example. The memory 67 may be used to store an operating system, applications and application data, for example.

The receiver 63 and the transmitter 64 may use one or more wired and/or wireless communication technologies such as Ethernet and/or (IEEE 802.11) to communicate with an access point to the Internet 59, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 63 and the transmitter 64 are combined into a transceiver. The server 61 may comprise other components typical for a server such as a power connector and a display. The invention may be implemented using a server program running on one or more processors.

Figure 3:
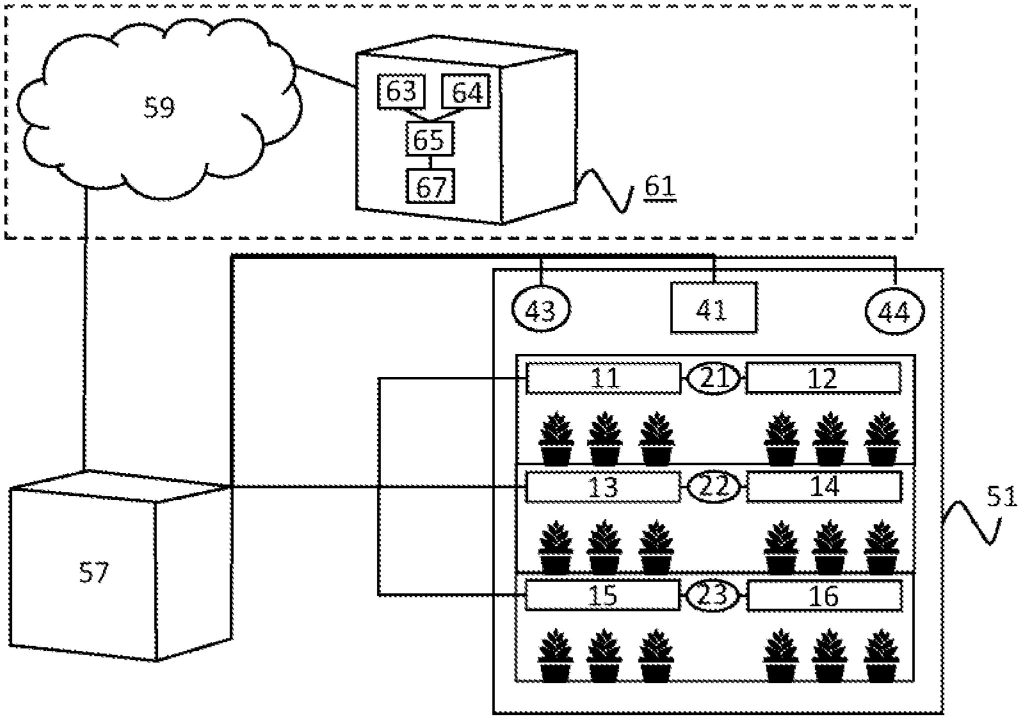
FIG. 3 is a block diagram of a third embodiment of the systems.

FIG. 3 shows a third embodiment of the system for determining at least one control parameter for at least one device controlling an environmental condition in a plant growing environment. In this third embodiment, the light control computer 10 and the climate control computer 30 have been combined into one light and climate control computer 57. The light and climate control computer 57 may execute a first software application for light control and a second software application for climate control or a single software application both light and climate control, for example.

Figure 4:
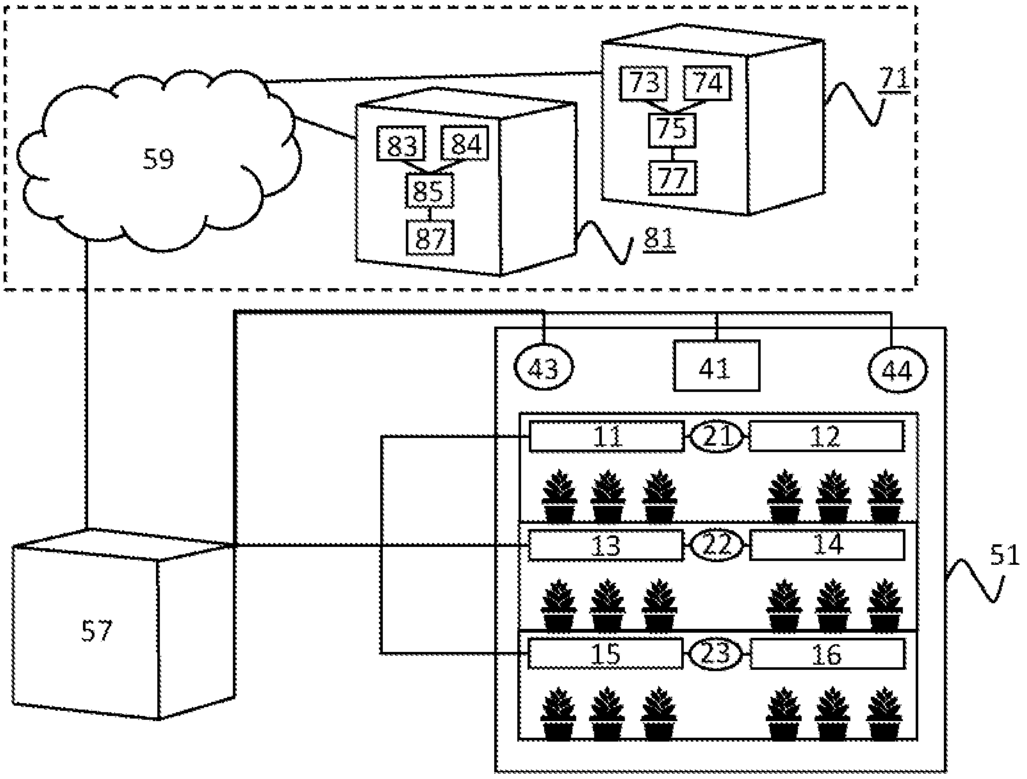
FIG. 4 is a block diagram of a fourth embodiment of the systems.

FIG. 4 shows a fourth embodiment of the system for determining at least one control parameter for at least one device controlling an environmental condition in a plant growing environment. In FIG. 4, a light control server 71 and a climate control server 81 are connected to the Internet 59. The light control server 71 is configured in a similar manner as the light control computer 1 of FIG. 1, except that the light control server 71 controls the LED modules 11-16 and receives Sensor data from the light sensors 21-23 via the light and climate control computer 57.

The climate control server 81 is configured in a similar manner as the climate control computer 31 of except that the climate control server 81 controls the HVAC system 41 and receives sensor data from the climate sensors 43-44 via the light and climate control computer 57. In the fourth embodiment, the light control server 71 and the climate control server 81 communicate with each other in order to share information, e.g. via a network API. Alternatively, or as backup, information may be shared in the application or between the applications executing on light and climate control computer 57, e.g. via a local API.

The light control server 71 may be a cloud server that runs a remote light control application and the climate control server 81 may be a cloud server that rims a remote climate control application, for example. The servers 71 and 81 may be operated by the same cloud service provider, for example. The light control application running on the light control server 71 and the climate control application running on the climate control server 81 may originate from different companies or from the same company.

The light control server 71 and/or the climate control server 81 may also obtain third party information from the Internet (e.g. weather forecasts, daylight radiation forecasts, cost of energy). One of the servers 71 and 81 may obtain third party information and share it with the other of the servers 71 and 81.

Figure 5:
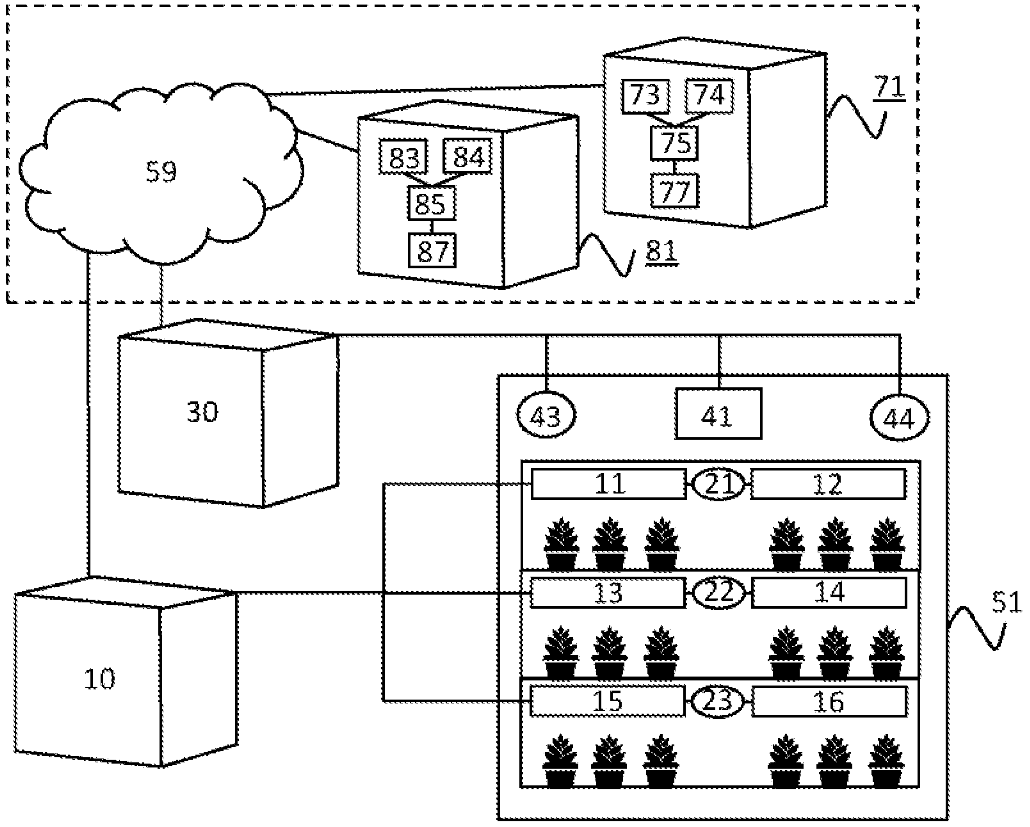
FIG. 5 is a block diagram of a fifth embodiment of the systems.

FIG. 5 shows a fifth embodiment of the system for determining at least one control parameter for at least one device controlling an environmental condition in a plant growing environment. The fifth embodiment is a variant on the fourth embodiment of FIG. 4. In the fifth embodiment, a separate light control computer 10 and a separate climate control computer 30 are used, see also FIG. 2, instead of the light and climate control computer 57. The light control computer 10 and the climate control computer 30 may be able to communicate, e.g. if the light control server 71 and the climate control server 81 are not able to communicate.

Figure 6:
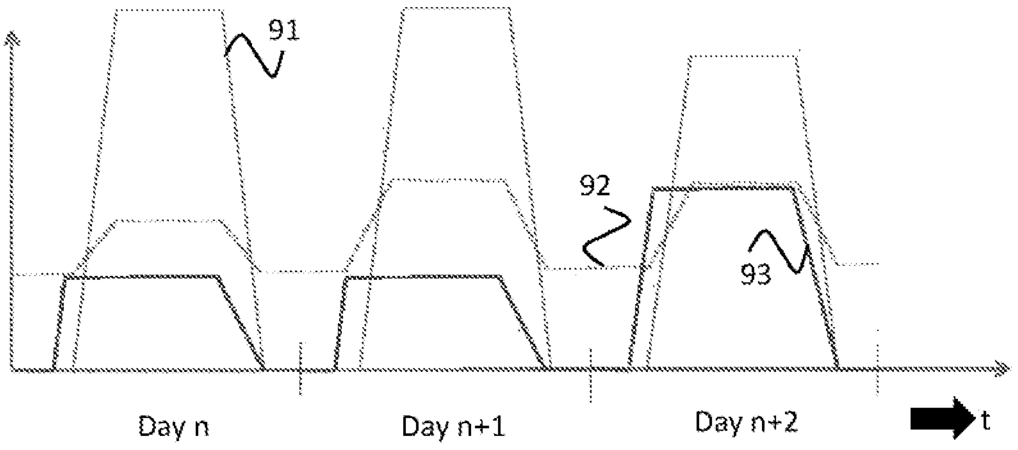
FIG. 6 shows an example of a grow protocol.

FIG. 6 shows an example of a grow protocol that comprises a light recipe and a climate recipe. The light recipe indicates a red-light level 91 and a blue-light level 93 over time. The climate recipe indicates a temperature 92 over time.

Figure 7:
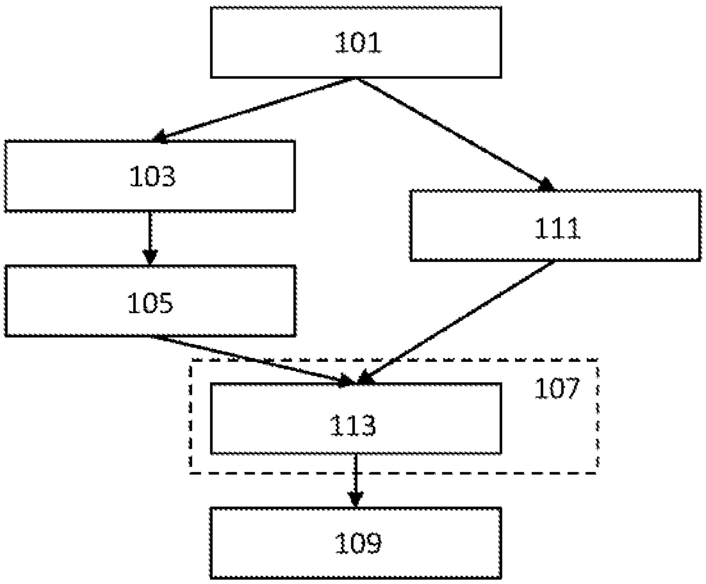
FIG. 7 is a flow diagram of a first embodiment of the first method.

A first embodiment of the method of determining at least one control parameter for at least one device controlling an environmental condition in a plant growing environment is shown in FIG. 7. A step 101 comprises obtaining one or more target values for the environmental condition. A step 103 comprises receiving information relating to control of a further environmental condition in the plant growing environment. A step 111 comprises obtaining electricity cost and/or demand information. Step 111 is performed before step 103, after step 105, simultaneously with step 103 and/or step 105, or between steps 103 and 105.

A step 105 comprises determining data which represent an anticipated influence of the control of the further environmental condition on the environmental condition from the information received in step 103. A step 107 comprises determining the at least one control parameter for the at least one device controlling the environmental condition based on the one or more target values and the data.

In the embodiment of FIG. 7, step 107 is implemented in a step 113. Step 113 comprises determining the at least one control parameter for the at least one device controlling the environmental condition based on the one or more target values, the data and the electricity cost and/or demand information (received in step 111). A step 109 comprises outputting or storing the at least one control parameter.

Step 113 makes it possible to anticipate on electricity needs and thereby enable purchasing electricity when prices are low or selling electricity when prices are high, to comply with boundary conditions as agreed with or defined by the utility company or government, and/or to distribute the electricity consumption to comply with demand-supply constraints. This may be beneficial for both a lighting control system and a climate control system, for example.

As a first example, a climate control system may communicate to the lighting control system when electricity prices are low/high in order for the lighting control system to decide on how to optimize the lighting to comply with demand-supply constraints or to balance the cost of energy and plant production. As a second example, a climate control system may communicate to the lighting control system when production demand is low/high or expected to be low/high in order for the lighting control system to deviate from the light recipe and adapt the lighting conditions to lower/increase the production in concert with the climate control system adapting the climate.

Figure 8:
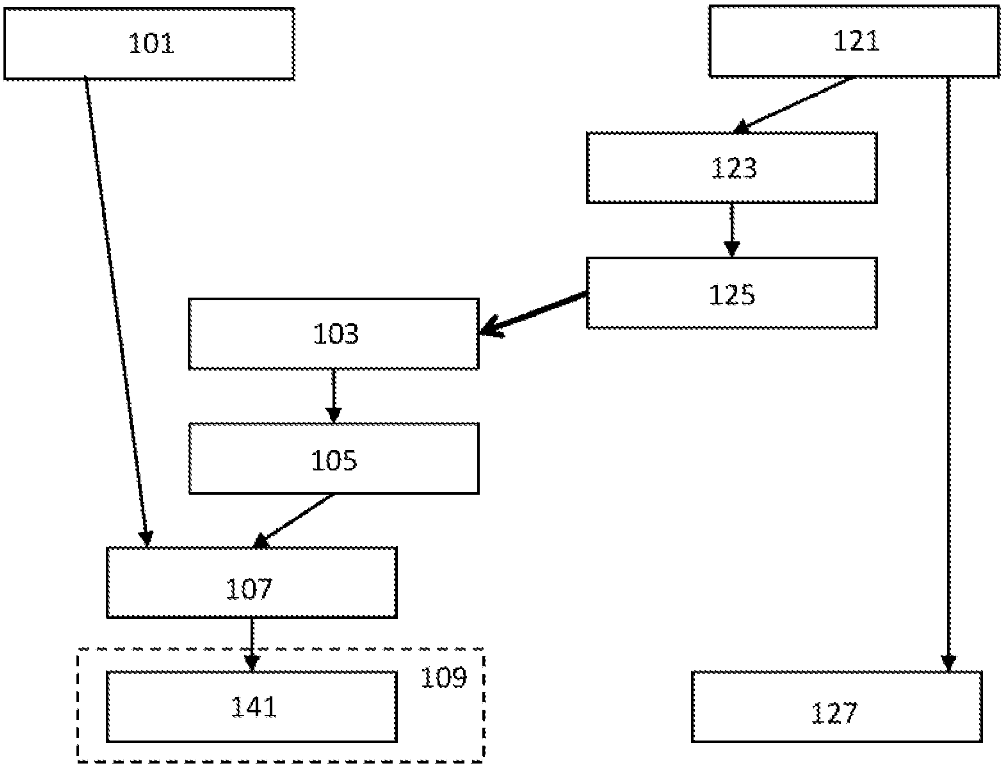
FIG. 8 is a flow diagram of a second embodiment of the first method and a first embodiment of the second method.

A second embodiment of the method of determining at least one control parameter for at least one device controlling an environmental condition in a plant growing environment is shown in FIG. 8, being performed by a first system. The at least one control parameter may comprise a plurality of control parameters for controlling the at least one device during a (e.g. future) control period. The at least one device may comprise a plurality of devices. FIG. 8 also shows a first embodiment of the method of controlling an environmental condition in a plant growing environment, being performed by a second system.

A step 121 comprises the second system receiving one or more target values for environmental condition B. A step 123 comprises the second system determining information from the one or more target values. The information comprises data which represent an anticipated influence of the control of the environmental condition B on environmental condition A. A step 125 comprises the second system transmitting the information to the first system.

Step 103 comprises the first system receiving the information from the second system. Step 105 comprises the first system determining data which represent an anticipated influence of the control of the environmental condition B on the environmental condition A from the information.

Step 101 comprises the first system Obtaining one or more target values for environmental condition A. Step 107 comprises the first system determining the at least one control parameter for the at least one device controlling the environmental condition A based on the one or more target values obtained in step 101 and the data determined in step 105. In the embodiment of FIG. 8, step 109 of FIG. 7 is implemented in a step 141. Step 141 comprises controlling the at least one device according to the at least one control parameter. A step 127 comprises the second system controlling the environmental condition B based on the one or more target values.

The first system and the second system are part of a control system. The control system may comprise a climate control system for controlling climate parameters and a lighting control system for controlling lighting parameters, for example. Both the climate control system and the lighting control system typically comprise a computer in combination with sensors, a software application, and actuators (to adjust the climate conditions and lighting conditions, respectively). On the climate control system, a climate recipe is executed. On the lighting control system, a light recipe is executed. The climate recipe and the light recipe may be stored in a grow protocol.

For example, the first system may be the climate control system, the second system may be the lighting control system and the climate control system may use the information received from the lighting control system to anticipate on climate control needs and thereby being able to more closely follow the climate recipe for optimal plant growth. For instance, the lighting control system may have very accurate information on how the heat load produced by lighting modules depends on the lighting settings (typically, modules with 4 dimmable color channels would be used). The same holds for the power consumption.

The lighting control system may also receive information from the climate control system, e.g. to allow it to combine the climate recipe with the light recipe and distill from this information the best possible light setting.

The climate recipe may conflict with the light recipe, e.g. because they originate from different companies. For example, according to the climate recipe the CO2 setpoint may be low while at the same time according to the light recipe the light setpoint may be high: this makes no sense since the light will be wasted. In this situation, the lighting control system may decide to deviate from the light recipe and lower the light level or communicate to the climate control system a conflict, or vice versa.

To avoid conflicts, when the climate control system decides to deviate from the climate recipe for some reason, it is desired to timely communicate this deviation to the lighting control system so the lighting control system can adapt, and vice versa. Preferably, care is taken to avoid unstable behavior in such coupled control systems, e.g. by appointing who is master and who is slave.

Next to climate and light, also fertigation conditions, logistics, etc. may be part of a grow protocol. The first system or the second system may be a fertigation control system or a logistics system, for example.

Figure 9:
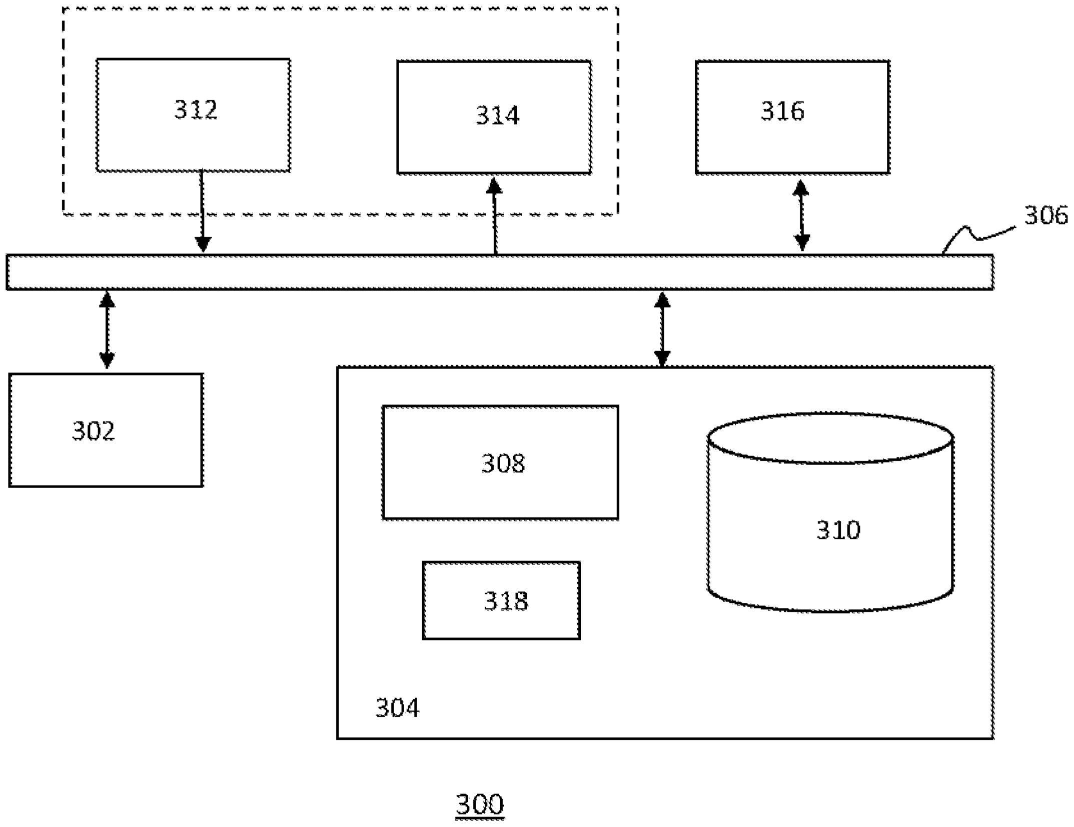
FIG. 9 is a block diagram of an exemplary data processing system for performing the method of the invention.

FIG. 9 depicts a block diagram illustrating an exemplary data processing system that may perform the method as described with reference to FIGS. 7 an 8.

As shown in FIG. 9, the data processing system 300 may include at least one processor 302 coupled to memory dements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of nm-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining at least one control parameter for at least one device controlling an environmental condition in a plant growing environment, said system comprising:

at least one communication interface; and at least one processor configured to:

obtain one or more target values for said environmental condition corresponding to future values of the environmental condition, wherein the environmental condition corresponds to at least one of lighting conditions or climate conditions provided to the plant growing environment, use said at least one communication interface to receive information relating to control of a further environmental condition in said plant growing environment, wherein said further environmental condition relates to a different physical property of the environment than said environmental condition, and wherein the further environmental condition corresponds to at least one of lighting conditions or climate conditions provided to the plant growing environment, determine, from said information, data which represent an anticipated influence of said control of said further environmental condition on said environmental condition, wherein said anticipated influence corresponds to a future anticipated change in the environmental condition caused by controlling said further environmental condition, determine, prior to the controlling of said further environmental condition, said at least one control parameter for said at least one device controlling said environmental condition based on said one or more target values and said data, and output or store said at least one control parameter.

2. The system as claimed in claim 1, wherein said at least one device comprises a plurality of devices and/or said at least one control parameter comprises a plurality of control parameters for controlling said at least one device during a control period.

3. The system as claimed in claim 2, wherein said control period is a future control period.

4. The system as claimed in claim 1, wherein said at least one processor is configured to use said at least one communication interface to control said at least one device according to said at least one control parameter.

5. The system as claimed in claim 1, wherein said at least one processor is configured to obtain a grow protocol for growing a plant, said grow protocol comprising said one or more target values, each of a plurality of growth stages being associated with at least one of said one or more target values.

6. The system as claimed in claim 1, wherein said environmental condition comprises temperature and said further environmental condition comprises lighting.

7. The system as claimed in claim 6, wherein said information comprises a profile representing expected heat dissipation and/or expected temperature increase.

8. The system as claimed in claim 6, wherein said at least one processor is configured to determine an anticipated temperature variation from said information, subtract said anticipated temperature variation from said one or more target values for said temperature and determine said at least one control parameter based on a result of said subtraction.

9. The system as claimed in claim 1, wherein said environmental condition comprises lighting and said further environmental condition comprises temperature.

10. The system as claimed in claim 9, wherein said at least one device comprises at least one lighting device which comprises at least one component for cooling and/or heating and said information comprises a profile representing anticipated environmental temperature variations and wherein said at least one processor is configured to determine said at least one control parameter for said at least one lighting device so as to adjust said cooling and/or heating in dependence on said anticipated environmental temperature variations exceeding a threshold amount.

11. The system as claimed in claim 1, wherein said at least one processor is further configured to use said at least one communication interface to obtain electricity cost and/or demand information and determine said at least one control parameter further based on said electricity cost and/or demand information.

12. The system as claimed in claim 1, wherein the determining of the data which represent the anticipated influence of said control of said further environmental condition on said environmental condition includes using a using a mathematical model associated with said control of said further environmental condition on said environmental condition.

13. A system for controlling an environmental condition in a plant growing environment, said system comprising:

at least one communication interface; and at least one processor configured to:

use said at least one communication interface to receive one or more target values for said environmental condition corresponding to future values of the environmental condition, wherein the environmental condition corresponds to at least one of lighting conditions or climate conditions provided to the plant growing environment, and wherein the further environmental condition corresponds to at least one of lighting conditions or climate conditions provided to the plant growing environment, determine information from said one or more target values, said information comprising data which represent an anticipated influence of said control of said environmental condition on a further environmental condition, wherein said further environmental condition relates to a different physical property of the environment than said environmental condition and wherein said anticipated influence corresponds to a future anticipated change in the future environmental condition caused by controlling said environmental condition, use said at least one communication interface to transmit said information, and control said environmental condition based on said one or more target values, wherein the determining of the information comprising data which represent the anticipated influence of said control of said environmental condition on said further environmental condition occurs prior to the control of said controlling said environmental condition.

14. The system as claimed in claim 13, wherein the determining of the information comprising data which represent the anticipated influence of said control of said environmental condition on a further environmental condition includes using a mathematical model associated said control of said environmental condition on said further environmental condition.

15. A method of determining at least one control parameter for at least one device controlling an environmental condition in a plant growing environment, said method comprising:

obtaining one or more target values for said environmental condition corresponding to future values of the environmental condition, wherein the environmental condition corresponds to at least one of lighting conditions or climate conditions provided to the plant growing environment;

receiving information relating to control of a further environmental condition in said plant growing environment, wherein said further environmental condition relates to a different physical property of the environment than said environmental condition, and wherein the further environmental condition corresponds to at least one of lighting conditions or climate conditions provided to the plant growing environment;

determining data which represent an anticipated influence of said control of said further environmental condition on said environmental condition from said information, wherein said anticipated influence corresponds to a future anticipated change in the environmental condition caused by controlling said further environmental condition;

determining, prior to the controlling of said further environmental condition, said at least one control parameter for said at least one device controlling said environmental condition based on said one or more target values and said data; and outputting or storing said at least one control parameter.

16. A non-transitory computer readable medium comprising instructions, the instructions, when executed by a computer system causes the computer system to perform the method of claim 15.

17. The method as claimed in claim 15, wherein the determining of the data which represent the anticipated influence of said control of said further environmental condition on said environmental condition includes using a using a mathematical model associated with said control of said further environmental condition on said environmental condition.

18. A method of controlling an environmental condition in a plant growing environment, said method comprising:

receiving one or more target values for said environmental condition corresponding to future values of the environmental condition, wherein the environmental condition corresponds to at least one of lighting conditions or climate conditions provided to the plant growing environment, and wherein the further environmental condition corresponds to at least one of lighting conditions or climate conditions provided to the plant growing environment;

determining information from said one or more target values, said information comprising data which represent an anticipated influence of said control of said environmental condition on a further environmental condition, wherein said further environmental condition relates to a different physical property of the environment than said environmental condition and wherein said anticipated influence corresponds to a future anticipated change in the future environmental condition caused by controlling said environmental condition; and transmitting said information;

controlling said environmental condition based on said one or more target values, wherein the determining of the information comprising data which represent the anticipated influence of said control of said environmental condition on said further environmental condition occurs prior to the controlling of said controlling said environmental condition.

19. The method as claimed in claim 18, wherein the determining of the information comprising data which represent the anticipated influence of said control of said environmental condition on said further environmental condition includes using a mathematical model associated said control of said environmental condition on said further environmental condition.

* * * * *